United States Patent [19]

Hahn et al.

[11] Patent Number: 4,759,027
[45] Date of Patent: Jul. 19, 1988

[54] GAS LASER

[75] Inventors: Guenther Hahn, Hoehenkirchen; Hans Krueger; Herbert Lamprecht, both of Munich, all of Fed. Rep. of Germany

[73] Assignee: Siemens Aktiengesellschaft, Berlin and Munich, Fed. Rep. of Germany

[21] Appl. No.: 33,262

[22] Filed: Apr. 2, 1987

[30] Foreign Application Priority Data

May 2, 1986 [DE] Fed. Rep. of Germany ....... 3614878

[51] Int. Cl.$^4$ .......................... H01S 3/03; H01S 3/045
[52] U.S. Cl. ........................................ 372/61; 372/34; 372/58; 372/66; 372/63
[58] Field of Search ....................... 372/61, 34, 36, 55, 372/66, 58, 63

[56] References Cited

U.S. PATENT DOCUMENTS

| 3,753,144 | 8/1973 | Kearns et al. | 372/87 |
| 3,763,442 | 10/1973 | McMahan | 372/61 |
| 4,385,390 | 5/1983 | McMahan | 372/61 |
| 4,477,907 | 10/1984 | McMahan | 372/61 |
| 4,625,317 | 11/1986 | Kolb et al. | 372/61 |

FOREIGN PATENT DOCUMENTS

| 0007785 | 1/1985 | Japan | 372/36 |
| 0138983 | 7/1985 | Japan | 372/36 |

Primary Examiner—James W. Davie
Assistant Examiner—Xuan T. Vo
Attorney, Agent, or Firm—Hill, Van Santen, Steadman & Simpson

[57] ABSTRACT

A laser discharge tube is provide having a ceramic rod of rectangular cross section through which extends a discharge channel and at least one gas return channel, and cooling plates affixed at the larger outside surfaces of the rectangular ceramic rod.

8 Claims, 1 Drawing Sheet

GAS LASER

BACKGROUND OF THE INVENTION

1. Field of the Invention

The present invention relates generally to a gas laser having a discharge channel in a discharge tube.

2. Description of the Related Art

A gas laser is disclosed in U.S. Pat. No. 3,753,144, showing examples of formats of gas lasers. In a first exemplary embodiment, a thin discharge tube and a separate gas return tube are provided. The first embodiment is not suitable for mounting mirrors on the discharge tube since differences in thermal expansion between the laser tube and the gas return line can cause misalignment of the mirror. On the other hand, another example shows the laser discharge capillary and the gas return channels accommodated in a relatively wide ceramic tube. Such arrangement generally exhibits a poor heat transfer characteristic from the capillary to the outside wall. Therefore, complex measures must be undertaken for heat dissipation.

SUMMARY OF THE INVENTION

An object of the present invention is to provide an improved heat transfer characteristic in a gas laser while also providing adequate mechanical strength and stability with respect to temperature fluctuations, and at little costs.

This and other objects are achieved in a gas laser having a discharge channel and at least one gas return channel formed within an elongated ceramic rod having a substantially rectangular cross section. The rectangular cross section of the ceramic rod provides adequate mechanical stability to the gas laser along with extremely good thermal stability. The improved thermal stability is aided by an appropriate arrangement of the discharge channels and the gas return channels. It is possible to integrate the gas return channels into the ceramic rod of the present invention. Particularly low thermal stresses result during operation of the gas laser when the laser discharge channel lies along an axis of symmetry of the ceramic rod and two of the gas return channels, each of circular cross section and the same diameter, are provided symmetrically spaced on either side of the discharge channel.

A plurality of cooling devices, such as cooling plates, are affixed to the outside of the ceramic rod for heat dissipation. The wall thickness of the ceramic rod between the discharge channel and the cooling plates is kept very thin so that heat is quickly eliminated by the cooling plates, thereby preventing thermic warping. The cooling plates for the present gas laser are affixed to at least the two opposed elongated surfaces of the ceramic body, and are preferably attached only at the two wider outside surfaces of the rectangular ceramic rod, since the majority of the heat generated by the operation of the gas laser is present there. In one preferred embodiment, the cooling plates have the same width as the ceramic rod. In this embodiment, manipulation of the ceramic rod results in relatively little loading with mechanical stresses. Furthermore, even during temperature fluctuations, the cooling plates provide extremely favorable temperature distribution.

In order to further improve the distribution of stresses due to temperature fluctuations and to provide particularly accurate mirror positions for the resonator mirrors, an embodiment of the ceramic rod is provided having 2n gas return channels that are uniformly distributed at both sides of the discharge channel, and symmetrically spaced therefrom. The 2n gas return channels are provided where n is a positive whole number. Preferably, n is equal to either one or two.

Thus, the present invention provides a gas laser which is relatively simple to manufacture and has a particularly favorable temperature distribution characteristic within the ceramic rod.

DESCRIPTION OF THE PREFERRED EMBODIMENTS

A gas laser is provided having a discharge tube 1 carrying resonator mirrors 5 at its respective opposite end faces to produce an optical resonator for laser light. The discharge tube 1 is also connected to electrode parts 3 and 4. A middle portion, or rod, 2 of the discharge tube 1 extending between the electrode parts 3 and 4 is of generally rectangular cross section and is provided with cooling plates 7.

Figure 1:
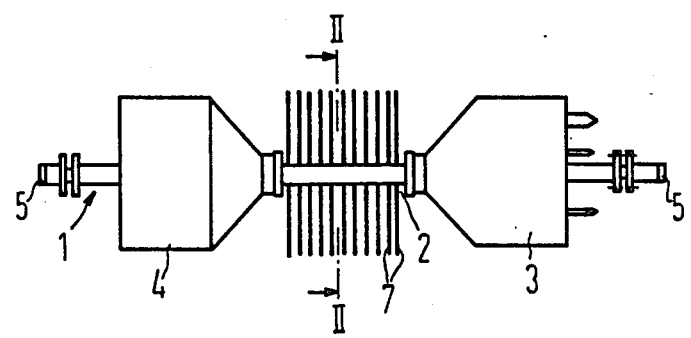
FIG. 1 is a side elevational view of a gas laser incorporating a laser discharge tube according to the principles of the present invention.
Figure 2:
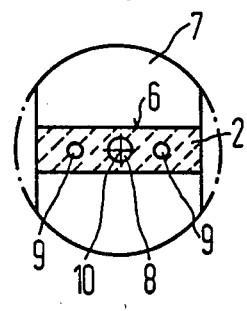
FIG. 2 is an enlarged cross section along the line II—II of FIG. 1 showing the discharge tube of the present invention.

As can be seen in FIG. 2, the cooling plates 7 are secured to an outside surface 6 of the rectangular mid-portion 2 of the discharge tube 1. As can be seen, the cooling plates 7 have the same width as, and are secured to, the two wider surfaces of the outside surface 6 of the rectangular midportion 2.

A discharge channel, or capillary, 8 extends concentrically along an axis of symmetry 10 of the discharge tube or rod 2. Gas return channels 9 are also provided arranged at identical distances from the axis of symmetry 10 and lying opposite one another.

The discharge tube, or rod, 1 is of a ceramic material. In a preferred embodiment, the ceramic tube or rod 2 is composed of $Al_2O_3$ ceramic; and the cooling plates 7 are preferably of copper.

Due to its rectangular shape, the ceramic rod 2 has a very small wall thickness between the discharge channel 8 and the cooling plates 7 so that heat generated in the discharge channel 8 is quickly dissipated to the cooling plates 7. The cooling plates 7 distribute the heat over the width of the ceramic tube 2, among other things, so that the ceramic tube 2 is heated uniformly, or respectively, cooled uniformly over its width. A relatively small, highly loadable embodiment of a laser discharge tube which is insensitive to thermal stresses is thereby provided.

The width of the ceramic rod 2 provides physical strength to withstand handling and to ensure that accurate alignment of the mirrors 5 is maintained. The symmetrical arrangement of discharge and gas return channels provides stability during thermal expansion and contraction.

Thus, a laser discharge tube 2 as disclosed herein has relatively great mechanical strength and high temperature transfer capabilities. The laser beam precision is high since misalignment of the resonator mirrors 5 is less likely with the present discharge tube. An example of a laser in which the present discharge tube can be used is an argon laser having a power output in the milliwatt range.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A gas laser having a discharge channel and at least one gas return channel extending between a pair of electrode parts, both channels extending through a ceramic rod, cooling devices being affixed to said ceramic rod and mirrors being held by said ceramic rod for optically resonating a laser emission of said gas laser, comprising:
   said ceramic rod has a substantially rectangular cross section and includes at least one gas return channel separate from said discharge channel;
   said cooling devices being affixed to outside surfaces of said rectangular ceramic rod at a slight distance from said discharge channel.

2. A gas laser as claimed in claim 1, wherein said discharge channel lies substantially along an axis of symmetry of said ceramic rod.

3. A gas laser as claimed in claim 1, wherein said cooling devices are cooling plates affixed only to broader ones of outside surfaces of said ceramic rod.

4. A gas laser as claimed in claim 3, wherein said cooling plates are of substantially the same width as said ceramic rod.

5. A gas laser as claimed in claim 1, wherein said ceramic rod includes $2n$ gas return channels wherein $n$ is a positive whole number, said gas return channels being uniformly distributed and symmetrically spaced at both sides of said discharge channel.

6. A discharge tube for use in a gas laser, comprising:
   an elongated ceramic body of generally rectangular cross section having:
      a longitudinally extending discharge channel in said ceramic body, and
      at least one longitudinally extending gas return channel in said ceramic body; and
   a plurality of heat conductive cooling plates affixed to at least two opposed elongated surfaces of said ceramic body.

7. A discharge tube as claimed in claim 6, wherein said elongated ceramic body has a greater width than height, and
   said cooling plates are affixed only along the width of said ceramic body.

8. A discharge tube as claimed in claim 6, further comprising:
   two of said gas return channels being disposed on opposite sides of and spaced from said discharge channel in said ceramic body.

* * * * *